(12) United States Patent
Maruyama et al.

(10) Patent No.: US 6,339,870 B1
(45) Date of Patent: Jan. 22, 2002

(54) METHOD OF MANUFACTURING ELECTRICAL WINDINGS

(75) Inventors: Syoichi Maruyama, Fukushima-ken; Sinichi Yamashiro, Hitachi; Kenji Mishima, Hitachiota, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/000,735

(22) Filed: Jan. 5, 1993

(30) Foreign Application Priority Data

Jan. 9, 1992 (JP) .............................................. 4-002138

(51) Int. Cl.$^7$ ............................................. H02K 15/085
(52) U.S. Cl. ........................................ 29/596; 29/605
(58) Field of Search ............................ 29/596, 598, 605

*Primary Examiner*—Carl E. Hall
(74) *Attorney, Agent, or Firm*—Antonelli, Terry, Stout & Kraus, LLP

(57) ABSTRACT

A method of manufacturing electrical windings, according to which it is possible to manufacture, with high efficiency, the electrical windings differing in function and capable of performing the functions required of the respective windings. In the steps of forming the windings by winding the conductors and applying insulation on the windings, there are formed the insulating layers 12, 22 and 32 suitable for the respective types of windings, viz. main pole coil 10, interpole coil 20 and compensating coils 30, and a same impregnating resin is impregnated and hardened in each of said main pole coil 10, interpole coil 20 and compensating coils 30.

5 Claims, 3 Drawing Sheets

METHOD OF MANUFACTURING ELECTRICAL WINDINGS

BACKGROUND OF THE INVENTION

This invention relates to a method of manufacturing electrical windings used for rotating electric machinery for rail and road vehicles, etc. More particularly, the invention pertains to an electrical winding manufacturing method which can be effectively applied to the manufacture of various types of electrical windings including the wires differing in shape, size and function while enabling the respective windings to perform the required functions.

Various methods have been employed for manufacturing the electrical windings. For example, in the case of field equipment for DC motor for rail vehicles, as illustrated in FIG. 2 of the accompanying drawings, a conductor 1 is wound several turns and a high-viscosity compound resin 2 is applied to the angular portion a on the inside to smoothen the surface of the conductor 1. Then a mica tape or a film is wound and, after providing an insulating layer 3, an impregnating low-viscosity resin is impregnated and hardened to form a field coil 4. Thereafter, the field coil 4 is inserted into a core 5 and a bonding high-viscosity resin 6 is cast into the space and hardened, thereby forming a field equipment 7. The techniques relating to this type of manufacturing method are disclosed in, for instance, Japanese Patent Publication No. 57-55013 (1982).

In another conventional method, as illustrated in FIG. 3, a conductor 1 is wound several turns; a non-woven cloth 8 is stuffed into the angular portion a on the inside; a mica tape or a film is wound; an insulating layer 3 is provided; the assembly is inserted into a core 5 through the medium of a non-woven cloth 9; and then an impregnating low-viscosity resin is integrally impregnated and hardened to form a field equipment 7. The techniques relating to this type of method are shown in, for instance, Japanese Utility Model Application Laid-Open No. 61-133436 (1986).

Recently, with an increasing tendency toward speed-up of vehicles, request has become stronger for enlargement of capacity of vehicle motors and reduction of size and weight of the parts. Strong request has also been voiced for the improvement of reliability of the windings for electric machinery. As for the method of manufacturing such electrical windings, of the two types of method mentioned above, the latter type of method in which an impregnating low-viscosity resin is integrally impregnated and hardened to form a uniform insulating layer and which is more suited for meeting said requirements has gained ground.

On the other hand, field equipment for DC motor for vehicles, as illustrated in FIG. 1 and as generally known, has a main pole coil 10 and an interpole coil as well, the latter being smaller than the main pole coil 10 and adapted for preventing movement of the neutral point caused by inconstant rotational speed of the motor and thereby bettering commutation. It is to be also noted that recently, in order to keep pace with speed-up of vehicles, remarkable strides have been made for the enlargement of capacity, speed-up and extension of the scope of speed adjustment of vehicle motor, and the influence of the distortion of reflux distribution in the main pole due to armature reaction has become innegligible. In the recent field equipments, therefore, a slot is provided in the core portion of the main pole and the compensating coils 30 having the insulating layers are placed therein to counteract the armature magnetomotive force.

Thus, the recent models of field equipment for DC motor for vehicles are usually provided with the electrical windings having different shapes and functions.

As mentioned above, the recent models of field equipment are mostly of a structure having plural electrical windings differing in function from each other, and as for their manufacturing method, a method comprising integral impregnation and hardening of an impregnating low-viscosity resin is most popular. However, when it is tried to manufacture a field equipment by simply combining these two concepts, there arise the problems such as mentioned below.

(1) The electrical windings used for field equipment differ in size (heat capacity) from each other, so that even if an impregnating low-viscosity resin is integrally impregnated and hardened, the rise of temperature in heat hardening differs and therefore the time required for the impregnated resin to harden (gel time) varies from one winding to the other, hence a possibility that the insulating layers formed may be non-uniform in properties.

(2) The shape of the electrical windings differs according to the type like main pole coil, interpole coil and compensating coil. For example, compensating coil is small in sectional area and long in distance between core end and coil end (hereinafter referred to as "projection length"). Main pole coil is large in sectional area and short in projection length. The properties required of the insulating layer differ from one winding to the other though withstand voltage is same, so that it is hardly possible to satisfy all the property requirements with a single insulating specification. For example, compensating coil is required to have a high mechanical strength as the projection length is large. On the other hand, main pole coil, because of its large sectional area, is high in rate of heat dissipation from the conductor, so that this type of winding is required to have a uniform heat conductivity and to keep free of delaminating layer such as air layer which hinders heat transfer between the insulating layers.

In order to solve the problem, Japanese Patent Application laid-Open No. 3-285540 discloses a method of manufacturing electrical windings comprising plural steps, wherein same materials are used for impregnating resins, but the sort of additives and/or hardening temperature is varied to apply impregnating resins to respective coils. However, such a method is complicated because the plural steps are necessary.

SUMMARY OF THE INVENTION

The object of the present invention is to provide a method of producing windings for electric machinery, according to which it is possible to produce, with high efficiency, the electrical windings differing in function and capable of performing the functions required of them respectively.

The above object of the invention can be accomplished by forming the insulating layers suitable for the respective types of electrical windings, that is, the windings differing in function, in the step of applying insulation on the windings formed by winding a conductor, and impregnating a single impregnating insulating resin in the different types of windings and hardening the resin in the step of setting the insulated windings in a core.

The above object of this invention can be also achieved by changing the properties of the insulating layers depending on the respective types of windings by changing the insulating material forming the insulating layers in the step of applying insulation, or by changing the properties of the insulating layers depending on the respective types of windings by changing the way of addition of the hardening accelerator which is reacted with the insulating resin added to the insulating material forming the insulating layers and determines the properties of said insulating resin in said step of applying insulation, or by changing the properties of the insulating layers depending on the respective types of windings by changing the kind of the hardening accelerator which is reacted with the insulating resin added to the insulating material forming the insulating layers and determines the properties of said resin in said step of applying insulation.

Said object of this invention can be also attained by changing the properties of the insulating layers depending on the respective types of windings by using a mica tape supported on a film for the insulating layers in the case of the windings which are small in heat capacity in heat drying of the impregnating resin because of small sectional area of said windings, or by using a mica film with glass cloth for the insulating layers in the case of the windings which are large in heat capacity in heat drying of the impregnating resin because of large sectional are a of said windings, in said step of applying insulation.

Moreover, the method of the present invention is also excellent in simplicity as compared with conventional ones because application of the impregnating resins can be carried out in a single step in the present invention.

Figure 1:
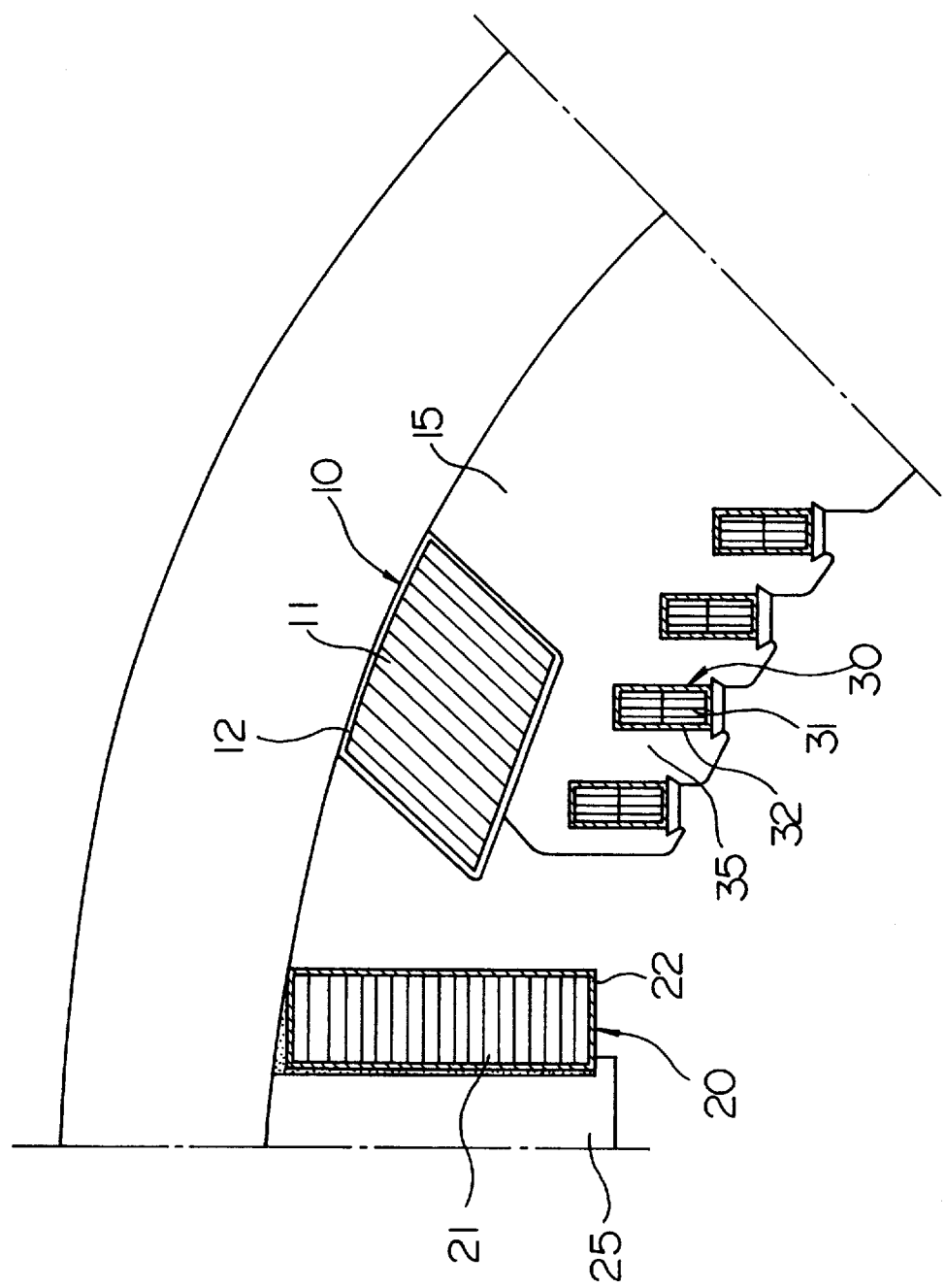
FIG. 1 is a sectional view of a field equipment having a main pole coil, an interpole coil and compensating coils as the different types of windings.
Figure 2:
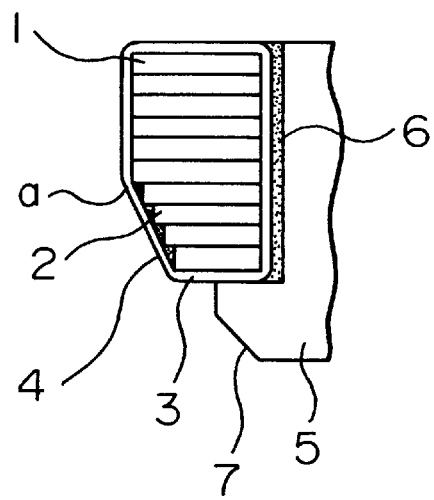
FIG. 2 is a sectional view of a conventional field equipment.
Figure 3:
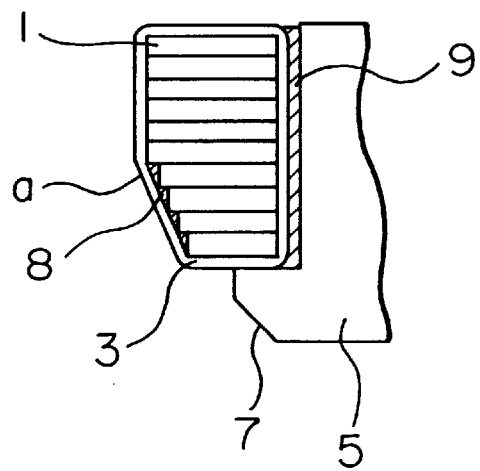
FIG. 3 is a sectional view of another conventional field equipment.

The reference numerals used in the drawings designate the followings:
- 10: main pole coil, 11: conductor of main pole coil, 12: insulating layers of main pole coil, 15: core of main pole coil, 20: interpole coil, 21: conductor of interpole coil, 22: insulating layers of interpole coil, 25: core of interpole coil, 30: compensating coil, 31: conductor of compensating coil, 32: insulating layers of compensating coil, 35: core of compensating coil.

DETAILED DESCRIPTION OF THE INVENTION

In the present invention, there are formed the insulating layers suitable for the respective types of electrical windings differing in function. That is, according to the present invention, although a single impregnating insulating resin is impregnated and hardened in the different types of windings, it is possible to form the insulating layers meeting the requirements of the respective windings by changing the properties of the insulating layers so as to match with the functions of the respective windings. Further, in the present invention, since a same impregnating resin is used for the different types of windings, it is possible to efficiently produce the electrical windings differing in function.

The properties of insulating layer are not decided by the impregnating resin alone; a substantial portion of the properties depends on the insulating material used. In the present invention, therefore, the insulating material used for forming the insulating layers is changed to vary the properties of the insulating layers depending on the respective types of winding. According to this scheme, it is possible to change the properties of the insulating layers after the insulating resin has been impregnated and hardened, even when using a same impregnating resin for the different types of windings.

The currently used insulating resins are mostly epoxy-based, and generally a combination of an epoxy resin and an acid anhydride hardener is employed. Such a combination alone, however, takes a long time for hardening, so that usually an appropriate hardening accelerator is added to the insulating material. In the present invention, the way of addition of the hardening accelerator reactive with the insulating resin to the insulating material forming the insulating layers is changed, for example, the coating weight of the hardening accelerator on the insulating layers is varied to change the hardening rate of the insulating resin while controlling the reaction mode of the insulating resin impregnated in the insulating layers as well as the hardening degree of the insulating resin, thereby changing the properties of the insulating layers depending on the respective types of windings.

Further, in the present invention, by changing the kind of said hardening accelerator, for example, by specifically selecting an imidazole hardening accelerator or a metallic salt hardening accelerator, the hardening rate of the insulating resin is changed while controlling the reaction mode of the insulating resin impregnated in the insulating layers and the degree of impregnation of the resin, thereby changing the properties of the insulating layers depending on the respective types of windings.

Also, in the present invention, a mica tape supported on a film is used for the insulating layers in the case of the windings which are small in heat capacity in heat drying of the impregnating resin because of small sectional area of said windings, and a mica tape with glass cloth is used for the insulating layers in the case of the windings which are large in heat capacity in heat drying of the impregnating resin because of large sectional area of said windings. This can also change the properties of the insulating layers depending on the respective types of windings.

In the following, examples of this invention are illustrated with reference to FIG. 1 and Table 1 while comparing them with a conventional example.

In both of the examples of this invention and the conventional example, a mixture of a bisphenol epoxy (e.g., Epikote 828 produced by Yuka Shell Epoxy Co., Ltd.) and an acid anhydride hardening accelerator (e.g., HN-5500 produced by Hitachi Chemical Company, Ltd.) blended at an equivalent ratio of 0.5–1.0:0.5–1.0 was prepared as the impregnating insulating resin to be impregnated and hardened in all of the main pole coil 10, interpole coil 20 and compensating coils 30.

Next, as illustrated in FIG. 1, the conductors 11, 21 and 31 specified in Table 1 were wound a plural number of turns to form the main pole coil 10, interpole coil 20 and compensating coils 30. Then a mica tape coated with a hardening accelerator reactive with the insulating resin was wound a predetermined number of turns around each of said coils to form the insulating layers 12, 22 and 32. The coils were embedded in the corresponding core portions 15, 25 and 35 through the medium of nonwoven cloth or polyamide paper, and then said impregnating resin composition was impregnated in said main pole coil 10, interpole coil 20 and compensating coils 30. The resulting products were left in an atmosphere of 180° C. for 20 hours to effect hardening of the resin composition.

TABLE 1

|  |  | Example of this invention X | Example of this invention Y | Example of this invention Z | Comparative Example (prior art) |
|---|---|---|---|---|---|
| Main pole coil | Conductor | Straight-angular conductor | Same as left | Same as left | Same as left |
|  | Insulating layers | Mica tape with glass cloth, 0.1 mm thick, half-lap wound 4 turns | Same as left | Same as left | Same as left |
|  | Hardening accelerator | Imidazole type, coated on the whole mica tape | Same as left | Same as left | Same as left |
| Interpole coil | Conductor | Straight-angular conductor | Same as left | Same as left | Same as left |
|  | Insulating layers | Mica tape with glass cloth, 0.1 mm thick, half-lap wound 4 turns | Same as left | Same as left | Same as left |
|  | Hardening accelerator | Imidazole type, coated on the whole mica tape | Same as left | Same as left | Same as left |
| Compensating coil | Conductor | Double glass winding | Same as left | Same as left | Same as left |
|  | Insulating layers | Mica tape supported on polyimide film, 0.13 mm thick, half-lap wound 3 turns | Mica tape with glass cloth, 0.1 mm thick, half-lap wound 4 turns | Same as left | Same as left |
|  | Hardening accelerator | Imidazole type, coated on the whole mica tape | Imidazole type, coated on one side alone of mica tape | Metallic salt type, coated on whole mica tape | Imidazole type, coated on the whole mica tape |
| Common | Impregnating resin | Bisphenol epoxy resin | Same as left | Same as left | Same as left |

For the embodiments of this invention, there were prepared three examples X, Y and Z by partly changing the insulating material forming the insulating layers as shown in Table 1.

By way of comparison, there was also prepared a conventional field equipment of the structure described in Table 1.

As a measure for comparing uniformity of the insulating layers on the respective windings for field equipment manufactured in the manner described above, the degree of hardening of the insulating resin impregnated in the insulating layers and their mechanical strength were examined. As a result, it was found that in the field equipment according to the conventional example (prior art), the insulating resin impregnated in the insulating layers of the compensating coils smallest of the three types of coil in sectional area was the greatest in degree of hardening, and there was a possibility of occurrence of heat deterioration depending on the size of field equipment. It was confirmed that when an indication of such heat deterioration appears, the mechanical strength of the insulating layers may lower and the projection length of the core may be elongated, making it unable to obtain the satisfactory insulating layers of compensating coils for which mechanical strength is required.

Figure 4:
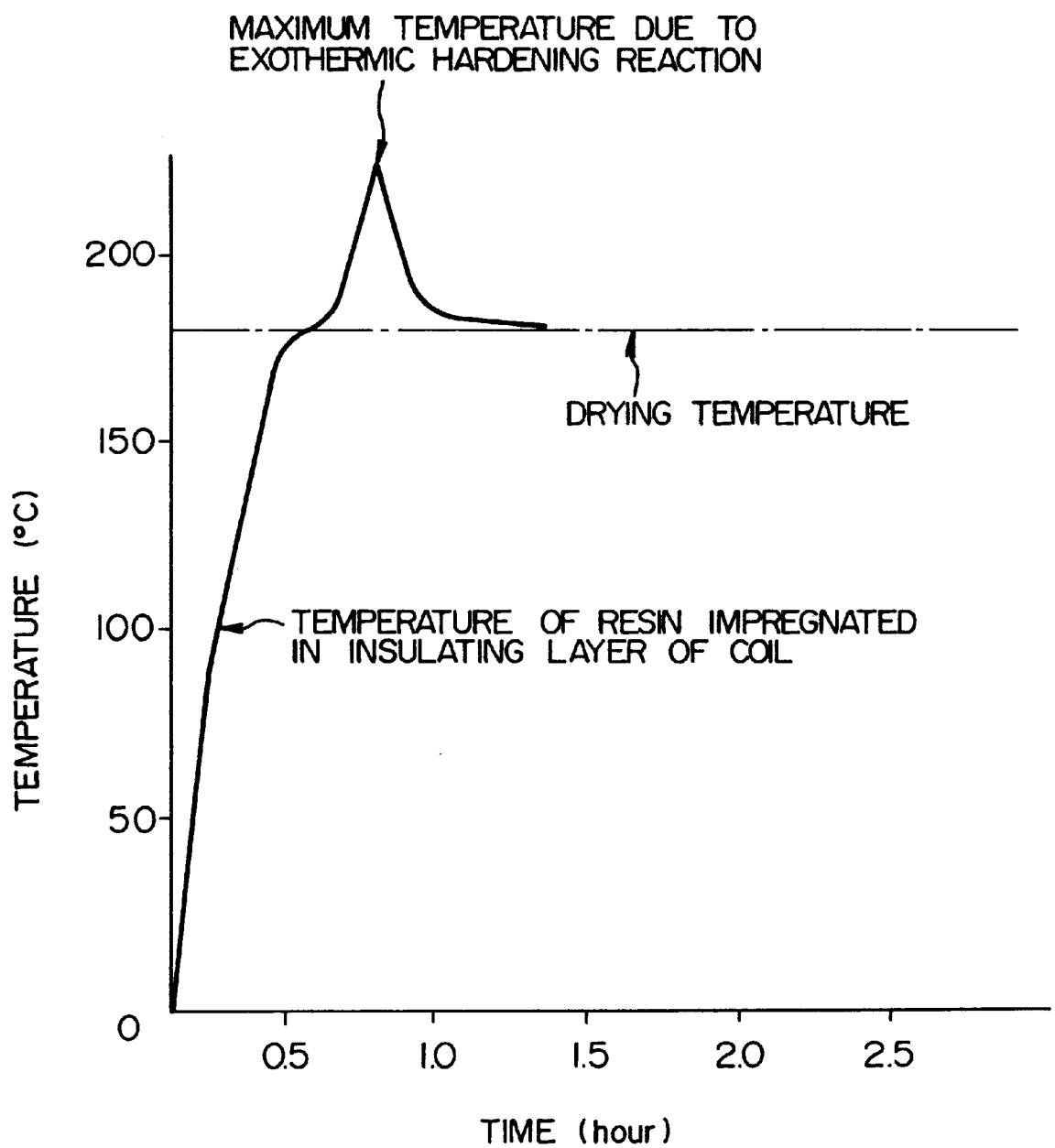
FIG. 4 is a graphic representation of the relation between the temperature of the resin impregnated in the winding and the drying temperature.

As contrasted with this, in the case of Example X of this invention, the degree of hardening of insulating resin of the compensating coil could be substantially equalized to that of the main pole coil and interpole coil by employing a resin non-absorptive film as support of the mica tape used for the compensating coil. This can be accounted for by the following fact. Hardening of the impregnating resin does not solely depend on the external drying temperature as shown in FIG. 4. Since heat is generated by the hardening reaction, the coil temperature becomes higher than the drying temperature. Therefore, by use of a film almost impervious to the insulating resin as support, the amount of the insulating resin contained in the whole insulating layers is decreased, with the result that the self calorific value of the winding is reduced and, because of this, the degree of hardening of the insulating resin of the compensating coil can be substantially equalized to that of the main pole coil and interpole coil in spite of the fact that the compensating coil is small in sectional area and most likely to receive the heat at the time of heat hardening as compared with the coils using a mica tape with glass cloth, i.e., mainpole coil and interpole coil.

In Examples Y and Z of this invention, the way of addition of the hardening accelerator in the mica tape used for the insulating layers of the compensating coil or the type of the hardening accelerator was changed to retard the hardening reaction of the impregnated insulating resin, thereby equalizing the degree of hardening with other coils even though the drying temperature was high, as in Example X.

In accordance with the present invention, as described above, there are formed the insulating layers suited to the respective types of electrical windings differing in function in the step of applying the insulating layers on the windings formed by winding the conductors, and further, a common impregnating resin is impregnated and hardened in the different types of windings in the step of setting the windings covered with said insulating layers in a core, so that it is possible to efficiently produce the electrical windings differing in function and capable of performing the functions required of the respective windings.

Further, in a first embodiment of this invention, the properties of the insulating layers are changed depending on the respective types of windings by changing the insulating material forming the insulating layers in said step of applying the insulating layers, and in a second embodiment of the invention, the properties of the insulating layers are changed depending on the respective types of windings by changing the way of addition of the hardening accelerator which is reacted with the insulating resin added to the insulating material forming the insulating resin added to the insulating material forming the insulating layers and determines the properties of the insulating resin in said step of applying the insulating layers. In a third embodiment of the invention, the properties of the insulating layers are changed depending on the respective types of windings by changing the type of the hardening accelerator which is reacted with the insulating resin added to the insulating material forming the insulating layers and determines the properties of the insulating resin in said step of applying the insulating layers. Therefore, according to any embodiment of the present invention, it is possible to manufacture, with high precision, the electrical windings having the insulating layers and differing in function, each winding being capable of performing its required functions.

Specifically, in the step of applying the insulating layers, the properties of the insulating layers are changed according to the type of windings by using a mica tape supported on a film for the insulating layers in the case of the windings which are small in heat capacity when heat drying the impregnating resin because of small sectional area of said windings, and by using a mica tape with glass cloth for the insulating layers in the case of the windings which are large in heat capacity when heat drying the impregnating resin because of large sectional area of said windings. This gives an additional assurance for the precise and effective manufacture of the electrical windings having the insulating layers and capable of performing the functions required of the respective windings.

What is claimed is:

1. A method of manufacturing electrical windings differing in function comprising the step of forming windings by winding conductors, the step of applying insulation on each of said windings, the step of embedding each of the windings covered with the insulating layers in a core, the insulating layers suitable for each of the respective types of windings being formed in said step of applying insulation, the step of impregnating a same resin in to all of the respective windings and a single step of hardening the impregnated same resin in all of the insulated windings to set the windings embedded in a core.

2. The method according to claim 1, wherein in the step of applying insulation the properties of the insulating layers are changed depending on the respective types of windings, by changing the insulating material forming the insulating layers.

3. The method according to claim 1, wherein in the step of applying insulation the properties of the insulating layers are changed depending on the respective types of windings by changing the way of addition of a hardening accelerator which is reacted with the impregnating resin added to the insulating material forming the insulating layers and determines the properties of said insulating resin.

4. The method according to claim 1, wherein in the step of applying insulation the properties of the insulating layers are changed depending on the respective types of windings by changing the type of a hardening accelerator which is reacted with the insulating resin added to the insulating material forming the insulating layers and determines the properties of said insulating resin.

5. The method according to claim 1, wherein, in the step of applying insulation layers, the properties of the insulating layers are changed depending on the respective types of windings by using a mica tape supported on a film for the insulating layers in the case of the windings which are small in heat capacity when heat drying the impregnating resin because of small sectional area of said windings, or by using a mica tape with glass cloth for the insulating layers in the case of the windings which are large in heat capacity when heat drying the impregnating resin because of large sectional area of said windings.

* * * * *